US008960761B2

(12) United States Patent
Newman

(10) Patent No.: US 8,960,761 B2
(45) Date of Patent: Feb. 24, 2015

(54) VEHICLE AND A WINDOW VISOR ASSEMBLY FOR THE VEHICLE

(71) Applicant: GM Global Technology Operations LLC, Detroit, MI (US)

(72) Inventor: Austin Lawrence Newman, Palm City, FL (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/773,953

(22) Filed: Feb. 22, 2013

(65) Prior Publication Data

US 2014/0239664 A1 Aug. 28, 2014

(51) Int. Cl.
*B60J 3/04* (2006.01)

(52) U.S. Cl.
CPC .......................................... *B60J 3/04* (2013.01)
USPC .......................................... 296/97.2; 359/603

(58) Field of Classification Search
CPC ................ B60J 3/00; B60J 3/007; B60J 3/04; B60J 3/06; B32B 17/10513
USPC ........... 296/97.1, 97.2, 97.3, 97.4, 97.5, 97.6; 362/492, 144; 359/603
See application file for complete search history.

(56) References Cited

U.S. PATENT DOCUMENTS 4,040,657 A * 8/1977 Penzes ........................... 296/97.2
6,131,987 A * 10/2000 Rossiter ........................ 296/97.8
6,666,493 B1 * 12/2003 Naik ............................. 296/97.4
6,811,201 B2 * 11/2004 Naik ............................. 296/97.2
7,413,233 B1 * 8/2008 Jung ............................. 296/97.7
8,083,385 B1 * 12/2011 Yang .............................. 362/492
2010/0276962 A1 * 11/2010 Zhang et al. ................. 296/97.2

FOREIGN PATENT DOCUMENTS

JP 2003048429 A * 2/2003
JP 2009029245 A * 2/2009

OTHER PUBLICATIONS

Article entitled "How Smart Windows Work" from the HowStuffWorks website; http://home.howstuffworks.com/home-improvement/construction/green/smart-window2.htm; retrieval date Dec. 20, 2012; 6 pages.

* cited by examiner

*Primary Examiner* — Jason S Morrow
*Assistant Examiner* — E Turner Hicks
(74) *Attorney, Agent, or Firm* — Quinn Law Group, PLLC

(57) ABSTRACT

A vehicle and a window visor assembly for the vehicle are disclosed. The window visor assembly includes a visor adapted to be coupled to the vehicle. The visor is rotatable between a retracted position and an extended position. The visor includes a first state changing layer and a second state changing layer spaced from each other. The first state changing layer is in a first mode when the first state changing layer is energized to thereby change the visibility through the visor. The second state changing layer is in a second mode when the second state changing layer is energized to thereby change the visibility through the visor differently from the first state changing layer when energized.

19 Claims, 4 Drawing Sheets

US 8,960,761 B2

VEHICLE AND A WINDOW VISOR ASSEMBLY FOR THE VEHICLE

TECHNICAL FIELD

The present disclosure relates to a vehicle and a window visor assembly for the vehicle.

BACKGROUND

Many vehicles have a passenger compartment. The passenger compartment generally includes a windshield and at least a pair of side windows. On sunny days, the sun shines through one or more of the windshield and the side windows. An opaque visor can be utilized to block some of the sun's rays.

SUMMARY

The present disclosure provides a window visor assembly for a vehicle. The window visor assembly includes a visor adapted to be coupled to the vehicle. The visor is rotatable between a retracted position and an extended position. The visor includes a first state changing layer and a second state changing layer spaced from each other. The first state changing layer is in a first mode when the first state changing layer is energized to thereby change the visibility through the visor. The second state changing layer is in a second mode when the second state changing layer is energized to thereby change the visibility through the visor differently from the first state changing layer when energized.

The present disclosure also provides a vehicle including an interior compartment. The vehicle further includes a visor coupled to the interior compartment and rotatable between a retracted position and an extended position. The visor includes a first state changing layer, a second state changing layer and a third state changing layer spaced from each other. The first state changing layer is in a first mode when the first state changing layer is energized to thereby change the visibility through the visor. The second state changing layer is in a second mode when the second state changing layer is energized to thereby change the visibility through the visor differently from the first state changing layer when energized. The third state changing layer is in a third mode when the third state changing layer is energized to thereby change the visibility through the visor differently from the first and second state changing layers when energized.

Therefore, the visor provides multiple functions to improve the usefulness of the visor. For example, the visor can be shaded or tinted for various driving conditions. As another example, the visor can be a mirror to reflect images.

The detailed description and the drawings or Figures are supportive and descriptive of the disclosure, but the scope of the disclosure is defined solely by the claims. While some of the best modes and other embodiments for carrying out the claims have been described in detail, various alternative designs and embodiments exist for practicing the disclosure defined in the appended claims.

BRIEF DESCRIPTION OF THE DRAWINGS

FIG. 5 is a schematic perspective view of the window visor assembly, with a third state changing layer in a third mode and a light device turned on.

DETAILED DESCRIPTION

Figure 1:
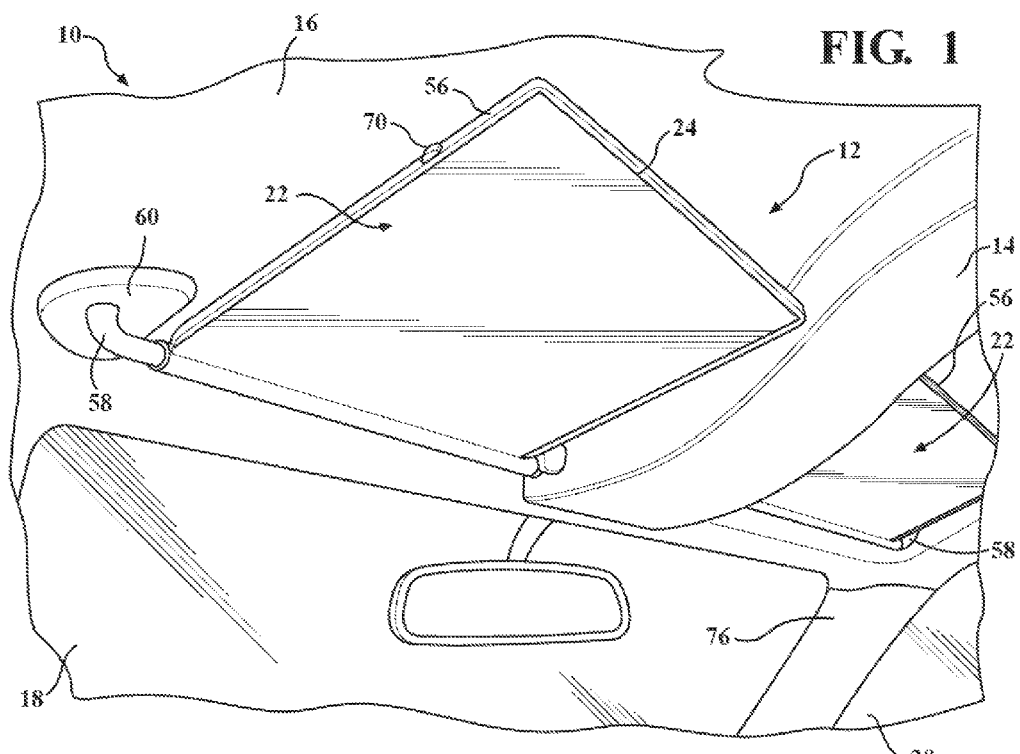
FIG. 1 is a schematic broken perspective view of a vehicle, with a window visor assembly including a visor in a retracted position.

Referring to the Figures, wherein like numerals indicate like or corresponding parts throughout the several views, a vehicle 10 and a window visor assembly 12 for the vehicle 10 are generally shown in FIG. 1. The vehicle 10 can be an automotive vehicle 10 or utilized in non-automotive applications including, for example, farm, marine, aviation applications, etc.

The vehicle 10 can include an interior compartment 14, with at least one user, such as a driver and/or one or more passengers, being able to enter and exit the interior compartment 14 of the vehicle 10. Therefore, for example, the interior compartment 14 can be a passenger compartment of the vehicle 10. Generally, the interior compartment 14 can include a headliner 16 attached to a roof of the vehicle 10.

The vehicle 10 can also include a windshield 18 to see outside of the interior compartment 14. Generally, the windshield 18 allows the user to see out of the interior compartment 14 toward a front of the vehicle 10. The vehicle 10 can also include one or more side windows 20 to see outside of the vehicle 10 along sides of the vehicle 10. For example, the side windows 20 allow the user to see out of the interior compartment 14 at the sides of the vehicle 10.

Figure 2:
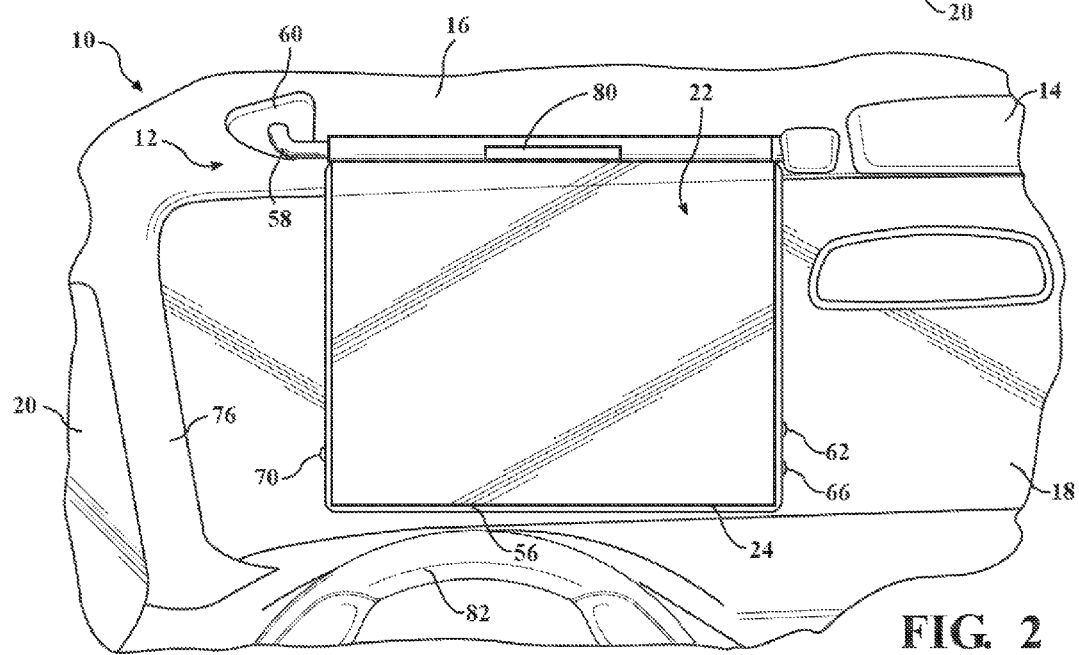
FIG. 2 is a schematic broken perspective view of the vehicle, with the visor in an extended position.

The window visor assembly 12 includes a visor 22 adapted to be coupled to the vehicle 10. The visor 22 is rotatable between a refracted position as shown in FIG. 1 and an extended position as shown in FIG. 2. In certain embodiments, the vehicle 10 can include the visor 22 coupled to the interior compartment 14. For example, the visor 22 is in the retracted position when folded away from the windshield 18 or one of the side windows 20 (see FIG. 1) and the visor 22 is in the extended position when folded down to overlap the windshield 18 or one of the side windows 20 (see FIG. 2). In other words, the visor 22 is in the retracted position when a distal edge 24 of the visor 22 is disposed adjacent to the headliner 16 and the visor 22 is in the extended position when the distal edge 24 of the visor 22 is spaced from the headliner 16. Simply stated, when the visor 22 is in the refracted position, the visor 22 is not being used by the user and is being stored, and when the visor 22 is in the extended position, the visor 22 is being used by the user.

Figure 5:
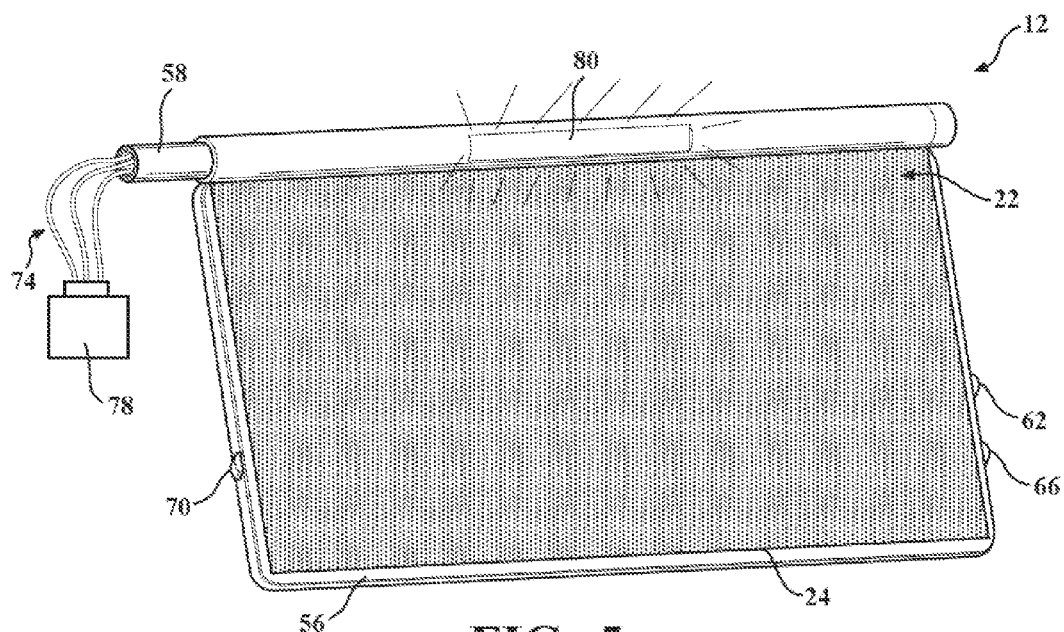
Figure 6:
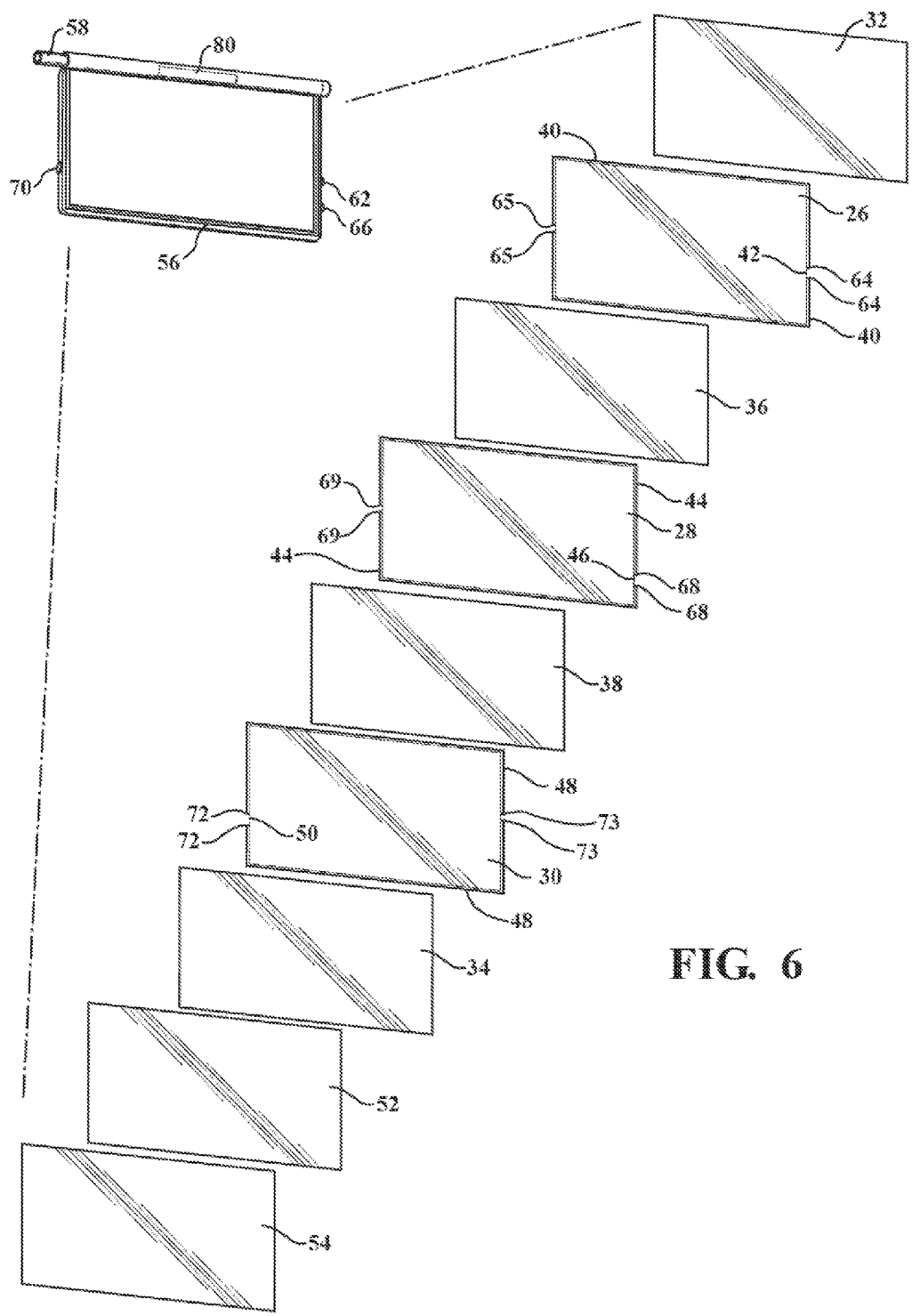
FIG. 6 is a schematic exploded perspective view of the visor.

Referring to FIG. 6, the visor 22 includes a first state changing layer 26 and a second state changing layer 28 spaced from each other. The first state changing layer 26 is in a first mode (see FIG. 3) when the first state changing layer 26 is energized to thereby change the visibility through the visor 22. The second state changing layer 28 is in a second mode (see FIG. 4) when the second state changing layer 28 is energized to thereby change the visibility through the visor 22 differently from the first state changing layer 26 when energized. In certain embodiments, the visor 22 can further include a third state changing layer 30 spaced from the first and second state changing layers 26, 28. In other words, the first, second and third state changing layers 26, 28, 30 are spaced from each other. The third state changing layer 30 is in a third mode (see FIG. 5) when the third state changing layer 30 is energized to thereby change the visibility through the visor 22 differently from the first and second state changing layers 26, 28 when energized. The first, second and third state changing layers 26, 28, 30 can be energized by electricity as discussed further below. It is to be appreciated that the order of the first, second and third state changing layers 26, 28, 30 in FIG. 6 is for illustrative purposes only and the first, second and third state changing layers 26, 28, 30 can be in different orders than illustrated in FIG. 6.

Each of the first, second and third state changing layers 26, 28, 30 can provide a transparent mode (see FIGS. 1, 2 and 7) when respective state changing layers 26, 28, 30 are de-energized to present transparent visibility through respective first, second and third state changing layers 26, 28, 30. In other words, when the first state changing layer 26 is in the transparent mode, the first state changing layer 26 is transparent or clear. Similarly, when the second state changing layer 28 is in the transparent mode, the second state changing layer 28 is transparent or clear. In addition, when the third state changing layer 30 is in the transparent mode, the third state changing layer 30 is transparent or clear. When the visor 22 is in the retracted position, all three of these layers 26, 28, 30 are de-energized at the same time (see FIG. 1). When the visor 22 is in the extended position, again, all three of these layers 26, 28, 30 can be de-energized at the same time (see FIG. 2) or one of the three layers 26, 28, 30 can be energized. For example, when the first state changing layer 26 is in the first mode, the second and third state changing layers 28, 30 are in the transparent mode. As another example, when the second state changing layer 28 is in the second mode, the first and third state changing layers 26, 30 are in the transparent mode. As yet another example, when the third state changing layer 30 is in the third mode, the first and second state changing layers 26, 28 are in the transparent mode.

Figure 3:
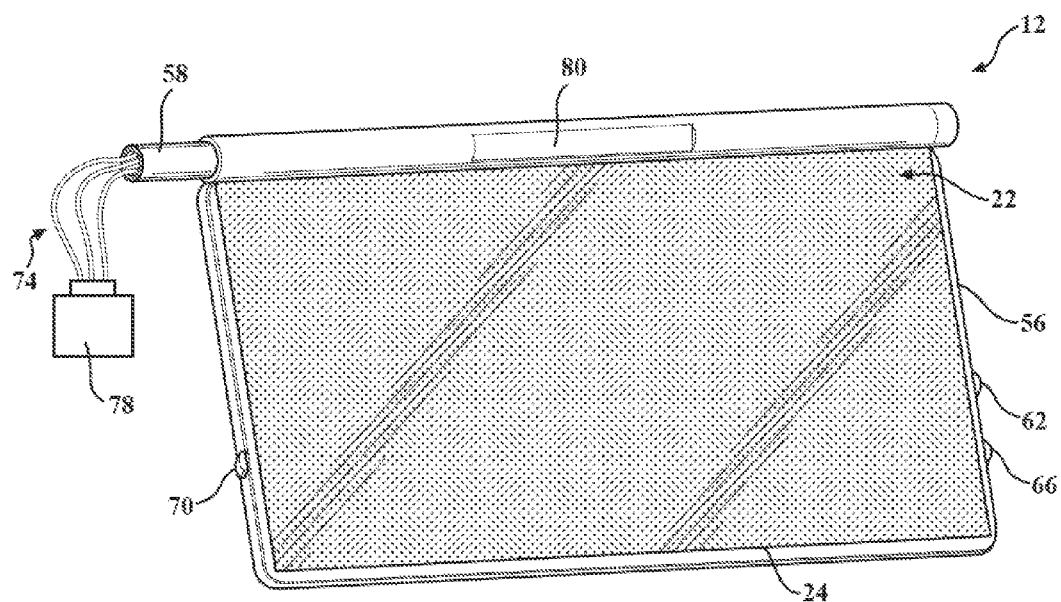
FIG. 3 is a schematic perspective view of the window visor assembly, with a first state changing layer in a first mode.

In certain embodiments, the first state changing layer 26 is an electrochromic layer presenting a black translucent shade through the visor 22 when the first state changing layer 26 is energized. Therefore, the first state changing layer 26 can transition between a clear appearance and a shaded or tinted appearance. FIG. 3 represents the shading of the first state changing layer 26 when energized. For example, the black translucent shade can be utilized to darken the visor 22 during daylight or bright driving conditions. Simply stated, when the first state changing layer 26 is energized, the visor 22 presents a blackish tint. For example, during a sunny day, it can be beneficial for the user to tint the visor 22 to decrease the brightness of the sun's rays from the user's eyes to improve visibility through the windshield 18 or the side windows 20. It is to be appreciated that the electrochromic layer for the first state changing layer 26 can be a green translucent shade, a blue translucent shade or any other suitable translucent color to tint the visor 22 during daylight driving conditions. It is also to be appreciated that the first state changing layer 26 can be a film, such as an electrochromic film.

Figure 4:
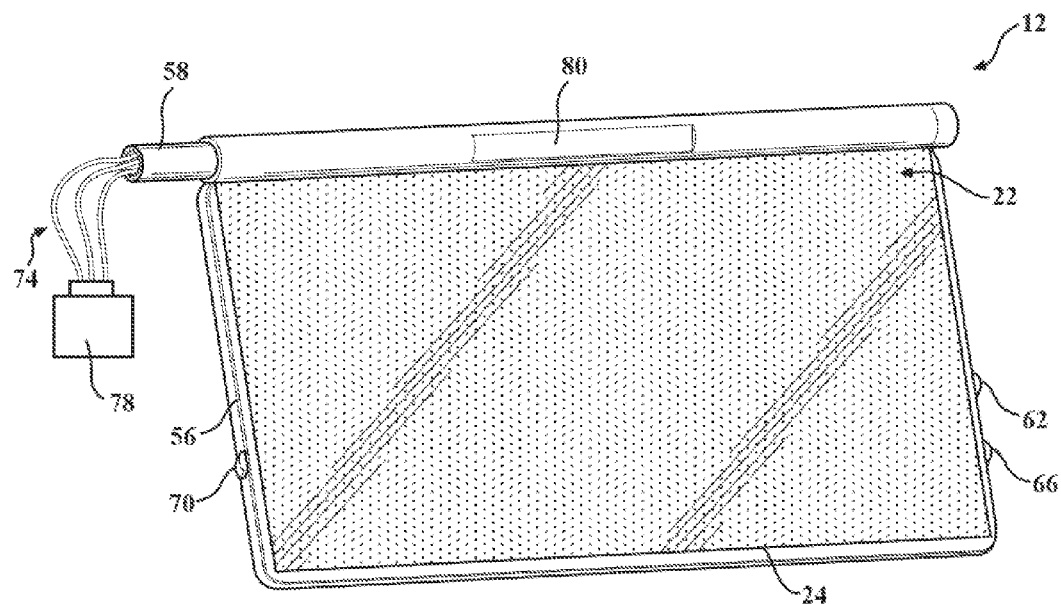
FIG. 4 is a schematic perspective view of the window visor assembly, with a second state changing layer in a second mode.

Furthermore, in certain embodiments, the second state changing layer 28 is an electrochromic layer presenting a yellow translucent shade through the visor 22 when the second state changing layer 28 is energized. Therefore, the second state changing layer 28 can transition between a clear appearance and a shaded or tinted appearance. FIG. 4 represents the shading of the second state changing layer 28 when energized. For example, the yellow translucent shade can be utilized to enhance visibility during night driving conditions or low visibility conditions such as rain, fog, etc. Simply stated, when the second state changing layer 28 is energized, the visor 22 presents a yellowish tint. For example, it can be beneficial for the user to tint the visor 22 to enhance the sharpness of the surroundings when the user desires to improve visibility during low visibility conditions or to assist the vehicle's headlights during night driving conditions. It is to be appreciated that the electrochromic layer for the second state changing layer 28 can be any other suitable translucent color to enhance visibility through the visor 22 during night driving conditions. It is also to be appreciated that the second state changing layer 28 can be a film, such as an electrochromic film.

In addition, in certain embodiments, the third state changing layer 30 is an electrochromic layer presenting a reflective opaque appearance in the visor 22 when the third state changing layer 30 is energized. Therefore, the third state changing layer 30 can transition between a clear appearance and a reflective appearance. FIG. 5 represents the reflective opaque appearance of the third state changing layer 30 when energized. For example, the reflective opaque appearance in the visor 22 can be utilized for reflecting an image. Simply stated, when the third state changing layer 30 is energized, the visor 22 presents a mirror. For example, it can be beneficial for the user to have the mirror available. It is to be appreciated that the electrochromic layer for the third state changing layer 30 can be a chrome-like color or any other suitable color to reflect the image in the visor 22. It is also to be appreciated that the third state changing layer 30 can be a film, such as an electrochromic film.

Referring to FIG. 6, in certain embodiments, the visor 22 can include a first cover layer 32 and a second cover layer 34. Generally, the first and second state changing layers 26, 28 are disposed between the first and second cover layers 32, 34. More specifically, in certain embodiments, the first, second and third state changing layers 26, 28, 30 are disposed between the first and second cover layers 32, 34. Therefore, the first and second cover layers 32, 34 generally surround the first, second and third state changing layers 26, 28, 30. In certain embodiments, the second cover layer 34 faces the windshield 18 when the visor 22 is in the extended position. It is to be appreciated that the first and second cover layers 32, 34 can be interchangeable with each other.

The first and second cover layers 32, 34 can be formed of a transparent material. Simply stated, the first and second cover layers 32, 34 are formed of a clear material. For example, the transparent material of each of the first and second cover layers 32, 34 can be glass. As another example, the transparent material of each of the first and second cover layers 32, 34 can be a polymer, such as a plastic, etc. Therefore, the first and/or second cover layers 32, 34 can be formed of clear glass or clear polymer. It is to be appreciated that the first and second cover layers 32, 34 can be formed of different transparent materials. It is to also be appreciated that when utilizing glass for the first and second cover layers 32, 34, the glass can be laminated glass.

Continuing with FIG. 6, furthermore, the visor 22 can further include a first partition layer 36 disposed between the first and second state changing layers 26, 28 to separate the first and second state changing layers 26, 28. In certain embodiments, the visor 22 can also include a second partition layer 38 disposed between the second and third state changing layers 28, 30 to separate the second and third state changing layers 28, 30. Therefore, in various embodiments, the first, second and third state changing layers 26, 28, 30 and the first and second partition layers 36, 38 can be disposed between the first and second cover layers 32, 34. It is to be appreciated that the first and second partition layers 36, 38 can be interchangeable with each other.

The first and second partition layers 36, 38 can be formed of a transparent material. Simply stated, the first and second partition layers 36, 38 are formed of a clear material. For example, the transparent material of each of the first and second partition layers 36, 38 can be glass. As another example, the transparent material of each of the first and second partition layers 36, 38 can be a polymer, such as a plastic, etc. Therefore, the first and/or second partition layers 36, 38 can be formed of clear glass or clear polymer. It is to be appreciated that the first and second partition layers 36, 38 can be formed of different transparent materials. It is to also be appreciated that when utilizing glass for the first and second partition layers 36, 38, the glass can be laminated glass.

Turning to FIG. 6, the vehicle 10 and the window visor assembly 12 can further include a first electrical wire 40 disposed adjacent to an outer periphery 42 of the first state changing layer 26 to selectively energize the first state changing layer 26. In addition, the vehicle 10 and the window visor assembly 12 can further include a second electrical wire 44 disposed adjacent to an outer periphery 46 of the second state changing layer 28 to selectively energize the second state changing layer 28. In certain embodiments, the vehicle 10 and the window visor assembly 12 can also include a third electrical wire 48 disposed adjacent to an outer periphery 50 of the third state changing layer 30 to selectively energize the third state changing layer 30. The first, second and third electrical wires 40, 44, 48 can be any suitable material or configuration for conducting electricity. For example, the first, second and third electrical wires 40, 44, 48 can be formed of copper.

Optionally, the visor 22 can include an anti-reflective layer 52 disposed adjacent to one of the first and second cover layers 32, 34. The anti-reflective layer 52 assists in decreasing glare that can be visible to on-coming vehicles when the visor 22 is in the extended position. In one embodiment, the anti-reflective layer 52 abuts one of the first and second cover layers 32, 34. More specifically, in one embodiment, the anti-reflective layer 52 can abut or cover the second cover layer 34. In another embodiment, the anti-reflective layer 52 is embedded in one of the first and second cover layers 32, 34. More specifically, in one embodiment, the anti-reflective layer 52 can be embedded in the second cover layer 34. It is to be appreciated that, optionally, a third cover layer 54 can be utilized such that the anti-reflective layer 52 is disposed between the second and third cover layers 34, 54 or disposed between the first and third cover layers 32, 54. For example, if the anti-reflective layer 52 is not utilized, the third cover layer 54 can be removed. It is to be appreciated that more than one anti-reflective layer 52 can be utilized. When utilizing two anti-reflective layers 52, one of the anti-reflective layers 52 covers, or is embedded in, the first cover layer 32 and another one of the anti-reflective layers 52 covers, or is embedded in, the second cover layer 34. As mentioned above, the anti-reflective layer 52 is optional, and for example, the anti-reflective layer 52 can be removed when the first and/or second cover layers 32, 34 are laminated.

Referring to FIGS. 2-5, the vehicle 10 and the window visor assembly 12 can also include a frame 56 attached to the visor 22 along the outer periphery 42, 46, 50 of each the first, second and third state changing layers 26, 28, 30. Therefore, generally, the frame 56 surrounds an edge of the visor 22 and thus supports the visor 22. In other words, the frame 56 supports all of the layers 26, 28, 30, 32, 34, 36, 38, 52, 54 of the visor 22. The frame 56 and the visor 22 are commonly rotatable between the retracted and extended positions. In other words, the frame 56 and the visor 22 rotate simultaneously between the retracted and extended positions. In certain embodiments, the frame 56 covers the first, second and third electrical wires 40, 44, 48 from the user's view for aesthetic purposes.

Turning to FIGS. 1 and 2, in addition, the vehicle 10 and the window visor assembly 12 can further include a support 58 attached to the interior compartment 14, with the visor 22 being supported by the support 58. More specifically, the support 58 can be attached to the headliner 16 of the interior compartment 14. Furthermore, the frame 56 is coupled to the support 58. In one embodiment, the visor 22 and the frame 56 are rotatable relative to the support 58 between the retracted and extended positions. In another embodiment, the support 58, the visor 22 and the frame 56 are commonly rotatable between the retracted and extended positions. Furthermore, the support 58 can pivot about a mounting portion 60 to move the visor 22 along one of the side windows 20 of the vehicle 10. Therefore, the support 58 and the frame 56 can commonly pivot about the mounting portion 60 of the support 58.

Figure 7:
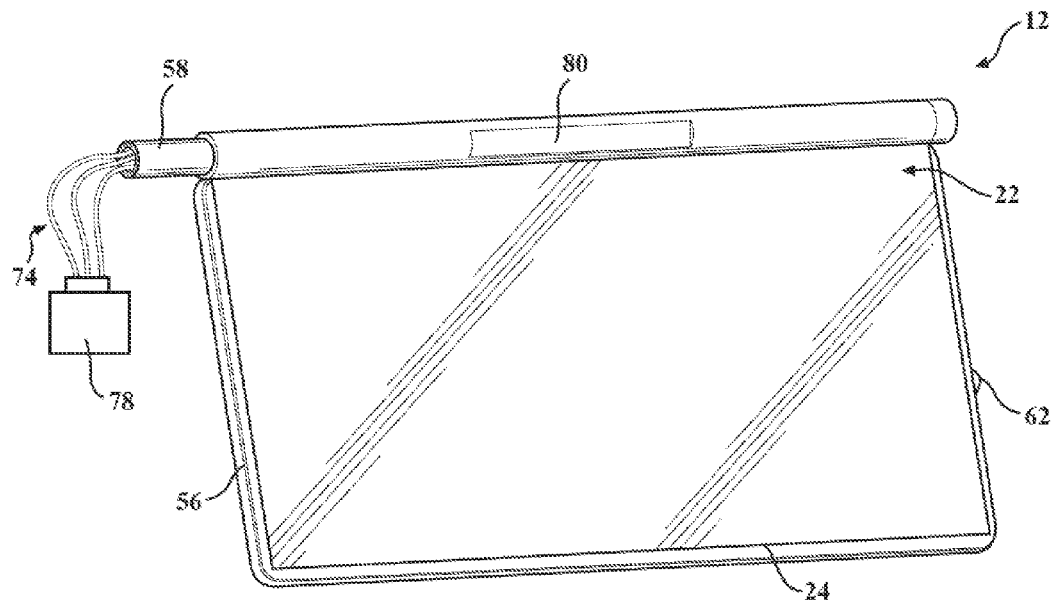
FIG. 7 is a schematic perspective view of the visor utilizing a single switch.

As best shown in FIGS. 3-5 and 7, the vehicle 10 and the window visor assembly 12 can further include a switch 62 coupled to the frame 56. At least one of the first, second and third electrical wires 40, 44, 48 are electrically connected to the switch 62 to selectively energize at least one of the first, second and third state changing layers 26, 28, 30. In one embodiment, as shown in FIG. 7, each of the first, second and third electrical wires 40, 44, 48 are electrically connected to the switch 62 to selectively energize each of the first, second and third state changing layers 26, 28, 30. In other words, FIG. 7 illustrates utilizing one switch 62 to control energizing of each of the first, second and third electrical wires 40, 44, 48. Therefore, moving the single switch 62 to different positions will determine which, if any, of the first, second and third electrical wires 40, 44, 48 is energized.

In another embodiment, as best shown in FIGS. 3-5, multiple switches 62, 66, 70 can be utilized as detailed below. Generally, the switch 62 is further defined as a first switch 62 electrically connected to the first electrical wire 40 to selectively energize the first state changing layer 26. Therefore, when the first switch 62 is on, a circuit is closed to the first electrical wire 40 which allows electricity to flow through the first electrical wire 40 to excite electrons in the electrochromic layer (of the first state changing layer 26) which causes the electrons to shift to produce a visual change in the layer 26, and thus, the first state changing layer 26 is energized to the first mode. Simply stated, electricity can cause a chemical reaction to change the properties of the first state changing layer 26. When the first switch 62 is off, the circuit is open and no electricity flows through the first electrical wire 40, and thus, the first state changing layer 26 is de-energized to the transparent mode. The first electrical wire 40 extends along the outer periphery 42 of the first state changing layer 26 to a pair of first ends 64 (see FIG. 6) spaced adjacent to each other and a pair of second ends 65 spaced adjacent to each other such that the first electrical wire 40 is split into two separate pieces. When the first switch 62 is on, the switch 62 electrically connects the two pieces of the first electrical wire 40 at the first ends 64. The second ends 65 of the first electrical wire 40 remain spaced from each other when the first switch 62 is on to direct electricity through the first state changing layer 26. In other words, electricity flows through the first state changing layer 26 between the two pieces of the first electrical wire 40 when the first switch 62 is closed. Simply stated, electricity flows into one piece of the first electrical wire 40, through the first state changing layer 26 and out the other piece of the first electrical wire 40 when the first switch 62 is closed.

Furthermore, in certain embodiments, continuing with FIGS. 3-5, the vehicle 10 and the window visor assembly 12 can also include a second switch 66 coupled to the frame 56 and spaced from the first switch 62. The second switch 66 is electrically connected to the second electrical wire 44 to selectively energize the second state changing layer 28. Therefore, when the second switch 66 is on, a circuit is closed to the second electrical wire 44 which allows electricity to flow through the second electrical wire 44 to excite electrons in the electrochromic layer (of the second state changing layer 28) which causes the electrons to shift to produce a visual change in the layer 28, and thus, the second state changing layer 28 is energized to the second mode. Simply stated, electricity can cause a chemical reaction to change the properties of the second state changing layer 28. When the second switch 66 is off, the circuit is open and no electricity flows through the second electrical wire 44, and thus, the second state changing layer 28 is de-energized to the transparent mode. The second electrical wire 44 extends along the outer periphery 46 of the second state changing layer 28 to a pair of first ends 68 (see FIG. 6) spaced adjacent to each other and a pair of second ends 69 spaced adjacent to each other such that the second electrical wire 44 is split into two separate pieces. When the second switch 66 is on, the switch 66 electrically connects the two pieces of the second electrical wire 44 at the first ends 68. The second ends 69 of the second electrical wire 44 remain spaced from each other when the second switch 66 is on to direct electricity through the second state changing layer 28. In other words, electricity flows through the second state changing layer 28 between the two pieces of the second electrical wire 44 when the second switch 66 is closed. Simply stated, electricity flows into one piece of the second electrical wire 44, through the second state changing layer 28 and out the other piece of the second electrical wire 44 when the second switch 66 is closed.

In addition, in certain embodiments, again continuing with FIGS. 3-5, the vehicle 10 and the window visor assembly 12 can further include a third switch 70 coupled to the frame 56 and spaced from the first and second switches 62, 66. The third switch 70 is electrically connected to the third electrical wire 48 to selectively energize the third state changing layer 30. Therefore, when the third switch 70 is on, a circuit is closed to the third electrical wire 48 which allows electricity to flow through the third electrical wire 48 to excite electrons in the electrochromic layer (of the third state changing layer 30) which causes the electrons to shift to produce a visual change in the layer 30, and thus, the third state changing layer 30 is energized to the third mode. Simply stated, electricity can cause a chemical reaction to change the properties of the third state changing layer 30. When the third switch 70 is off, the circuit is open and no electricity flows through the third electrical wire 48, and thus, the third state changing layer 30 is de-energized to the transparent mode. The third electrical wire extends along the outer periphery 50 of the third state changing layer 30 to a pair of first ends 72 (see FIG. 6) spaced adjacent to each other and a pair of second ends 73 spaced adjacent to each other such that the third electrical wire 48 is split into two separate pieces. When the third switch 70 is on, the switch 70 electrically connects the two pieces of the third electrical wire 48 at the first ends 72. The second ends 73 of the third electrical wire 48 remain spaced from each other when the third switch 70 is on to direct electricity through the third state changing layer 30. In other words, electricity flows through the third state changing layer 30 between the two pieces of the third electrical wire 48 when the third switch 70 is closed. Simply stated, electricity flows into one piece of the third electrical wire 48, through the third state changing layer 30 and out the other piece of the third electrical wire 48 when the third switch 70 is closed. It is to be appreciated that the switches 62, 66, 70 can be disposed in any suitable location and FIGS. 3-5 and 7 are only examples. It is to also be appreciated that the first ends 64, 68, 72 of the first, second and third state changing layers 26, 28, 30 can be any suitable location corresponding to the location of the switches 62, 66, 70. In addition, the second ends 65, 69, 73 of the first, second and third state changing layers 26, 28, 30 can be any suitable location.

Simply stated, for the embodiment shown in FIGS. 3-5, the first switch 62 controls energizing the first electrical wire 40, the second switch 66 controls energizing the second electrical wire 44 and the third switch 70 controls energizing the third electrical wire 48. Said differently, in the embodiment of FIGS. 3-5, separate and individual switches 62, 66, 70 control the energizing of respective electrical wires 40, 44, 48. It is to be appreciated that any suitable number of switches 62, 66, 70 can be utilized.

The switches 62, 66, 70 can be a push button, a turn knob, a slider or any other suitable type of switch. It is to be appreciated that the switches 62, 66, 70 can be electrically coupled to the first, second and third state changing layers 26, 28, 30 to automatically de-energize the layers 26, 28, 30 to shut off the shading or the mirror when the visor 22 moves to the retracted position.

Optionally, one or more of the switches 62, 66, 70 can be dimmer switches to change the amount of shading of the first and second state changing layers 26, 28 when energized or change the amount of reflectiveness of the third state changing layer 30 when energized. For example, when the first state changing layer 26 is energized, the dimmer switch can increase or decrease the shading or tinting of the visor 22. Therefore, the first state changing layer 26 can be darker or lighter depending on the user's preference.

Turning back to FIG. 3, the vehicle 10 and the window visor assembly 12 can further include a wire harness 74 disposed through the support 58 and electrically connected to at least one of the first, second and third switches 62, 66, 70 to supply electricity, current or power to the first, second and third state changing layers 26, 28, 30 to selectively energize one of the first, second and third state changing layers 26, 28, 30. For example, when utilizing only one switch 62, the wire harness 74 is electrically connected to the single switch 62. As another example, when utilizing the first, second and third switches 62, 66, 70, the wire harness 74 is electrically connected to each of the first, second and third switches 62, 66, 70. The wire harness 74 can be fed through the headliner 16 and/or one or more of the pillars 76 (see FIGS. 1 and 2), such as the A-pillars of the vehicle 10.

Continuing with FIG. 3, the wire harness 74 can be electrically coupled to a power supply 78. The power supply 78 can supply electricity to the visor 22 to selectively energize the first, second and/or third state changing layers 26, 28, 30. For example, the power supply 78 can be a battery or any other suitable power supply 78.

As best shown in FIGS. 3-5, optionally, the vehicle 10 and the window visor assembly 12 can further include a light device 80 coupled to the frame 56. The light device 80 is selectively actuated to light the interior compartment 14. In certain embodiments, the light device 80 can be actuated when the third state changing layer 30 is energized. Therefore, for example, if conditions are dark, actuating the light device 80 will increase visibility in the interior compartment 14. Generally, the light device 80 can be utilized with the mirror. The light device 80 can be rotatable with the frame 56 between the retracted and extended positions. In one embodiment, the light device 80 can be automatically actuated or energized to light the interior compartment 14 when the visor 22 is in the extended position. In other embodiment, the light device 80 is manually actuated or energized to light the interior compartment 14, such as for example, by utilizing a switch. It is to be appreciated that the light device 80 can also be electrically connected to the third switch 70 such that the light device 80 and the third state changing layer 30 are simultaneously energized when actuating the third switch 70. Furthermore, another switch can be utilized to actuate the light device 80 separate from the first, second and third switches 62, 66, 70. The light device 80 is shown actuated or energized in FIG. 5. It is to be appreciated that the switch can be electrically coupled to the light device 80 to automatically shut off the light device 80 when the visor 22 moves to the retracted position.

The visor 22 can be any suitable configuration and size. For example, the visor 22 can extend to the distal end 64 adjacent to a steering wheel 82 of the vehicle 10 as shown in FIG. 2. In this example, the user's vision is primarily through the visor 22 when the user is looking through the windshield 18. The visor 22 can be this size due to the translucency of the visor 22 when in the transparent mode or in one of the first and second modes as compared to an opaque visor of the prior art which does not provide visibility therethrough at any time. The visor 22 is configured to rotate past the steering wheel 82 without engaging the steering wheel 82. In other words, the steering wheel 82 will not interfere with the position of the visor 22. The size of the visor 22 allows for a large mirror when the third state changing layer 30 is energized which can improve the user's enjoyment of utilizing the mirror.

The visor 22 as discussed above provides multiple functions or uses. For example, this single visor 22 can provide shading for day and night driving conditions, as well as provide the mirror when it is desirable to reflect images. When the visor 22 is in the transparent mode or in one of the first and second modes, the visor 22 does not limit visibility through the windshield 18 or the side windows 20, and therefore, the visor 22 as discussed above removes visibility restrictions of an opaque visor of the prior art. For example, traffic lights will be visible through the visor 22 when the visor 22 is in the transparent mode or in one of the first and second modes as compared to the opaque visor of the prior art which does not provide visibility therethrough at any time. It is to be appreciated that the visor 22 discussed above can be defined as a plurality of visors 22, with each of the visors 22 coupled to the interior compartment 14 and spaced from each other as shown in FIG. 1. The visors 22 can have all of the features discussed above for the single visor 22, and therefore, the details will not be re-discussed. It is to further be appreciated any suitable number of visors 22 can be utilized.

While the best modes for carrying out the disclosure have been described in detail, those familiar with the art to which this disclosure relates will recognize various alternative designs and embodiments for practicing the disclosure within the scope of the appended claims.

The invention claimed is:

1. A window visor assembly for a vehicle, the assembly comprising:
   a visor adapted to be coupled to the vehicle and rotatable between a refracted position and an extended position; and
   wherein the visor includes a first state changing layer and a second state changing layer spaced from each other, with the first state changing layer being in a first mode when the first state changing layer is energized to thereby change the visibility through the visor and the second state changing layer being in a second mode when the second state changing layer is energized to thereby change the visibility through the visor differently from the first state changing layer when energized;
   wherein the visor includes a first partition layer disposed between the first and second state changing layers to separate the first and second state changing layers.

2. An assembly as set forth in claim 1 wherein the visor includes a third state changing layer spaced from the first and second state changing layers, with the third state changing layer being in a third mode when the third state changing layer is energized to thereby change the visibility through the visor differently from the first and second state changing layers when energized.

3. An assembly as set forth in claim 2 wherein the third state changing layer is an electrochromic layer presenting a reflective opaque appearance in the visor when the third state changing layer is energized.

4. An assembly as set forth in claim 2 wherein each of the first, second and third state changing layers provide a transparent mode when respective state changing layers are de-energized to present transparent visibility through respective first, second and third state changing layers.

5. An assembly as set forth in claim 2 wherein the visor includes a first cover layer and a second cover layer, with the first, second and third state changing layers disposed between the first and second cover layers.

6. An assembly as set forth in claim 1 wherein the visor includes a third state changing layer spaced from the first and second state changing layers, with the third state changing layer being in a third mode when the third state changing layer is energized to thereby change the visibility through the visor differently from the first and second state changing layers when energized, and wherein the visor includes a second partition layer disposed between the second and third state changing layers to separate the second and third state changing layers.

7. An assembly as set forth in claim 6 wherein the visor includes a first cover layer and a second cover layer, with the first, second and third state changing layers and the first and second partition layers disposed between the first and second cover layers.

8. An assembly as set forth in claim 1 wherein the visor includes a first cover layer and a second cover layer, with the first and second state changing layers disposed between the first and second cover layers.

9. An assembly as set forth in claim 1 wherein the first state changing layer is an electrochromic layer presenting a black translucent shade through the visor when the first state changing layer is energized.

10. An assembly as set forth in claim 1 wherein the second state changing layer is an electrochromic layer presenting a yellow translucent shade through the visor when the second state changing layer is energized.

11. An assembly as set forth in claim 1 further including a first electrical wire disposed adjacent to an outer periphery of the first state changing layer to selectively energize the first state changing layer.

12. An assembly as set forth in claim 11 further including a second electrical wire disposed adjacent to an outer periphery of the second state changing layer to selectively energize the second state changing layer.

13. An assembly as set forth in claim 12 wherein the visor includes a third state changing layer spaced from the first and second state changing layers, with the third state changing layer being in a third mode when the third state changing layer is energized to thereby change the visibility through the visor differently from the first and second state changing layers when energized, and further including a third electrical wire disposed adjacent to an outer periphery of the third state changing layer to selectively energize the third state changing layer.

14. An assembly as set forth in claim 13 further including a frame attached to the visor along the outer periphery of each the first, second and third state changing layers such that the frame surrounds an edge of the visor, and with the frame and the visor commonly rotatable between the retracted and extended positions.

15. An assembly as set forth in claim 14 further including a switch coupled to the frame, with at least one of the first, second and third electrical wires electrically connected to the switch to selectively energize at least one of the first, second and third state changing layers.

16. An assembly as set forth in claim 15 wherein the switch is further defined as a first switch electrically connected to the first electrical wire to selectively energize the first state changing layer, and further including a second switch coupled to the frame and spaced from the first switch, with the second switch electrically connected to the second electrical wire to selectively energize the second state changing layer.

17. An assembly as set forth in claim 16 further including a third switch coupled to the frame and spaced from the first and second switches, with the third switch electrically connected to the third electrical wire to selectively energize the third state changing layer.

18. An assembly as set forth in claim 15 wherein each of the first, second and third electrical wires are electrically connected to the switch to selectively energize each of the first, second and third state changing layers.

19. A vehicle comprising:
   an interior compartment;
   a visor coupled to the interior compartment and rotatable between a retracted position and an extended position; and
   wherein the visor includes a first state changing layer, a second state changing layer and a third state changing layer spaced from each other, with the first state changing layer being in a first mode when the first state changing layer is energized to thereby change the visibility through the visor, the second state changing layer being in a second mode when the second state changing layer is energized to thereby change the visibility through the visor differently from the first state changing layer when energized and the third state changing layer being in a third mode when the third state changing layer is energized to thereby change the visibility through the visor differently from the first and second state changing layers when energized;
   wherein the visor includes a first partition layer disposed between the first and second state changing layers to separate the first and second state changing layers.

* * * * *